Oct. 24, 1950 A. E. ANDERSON 2,527,113

MULTITARGET CATHODE-RAY DEVICE

Filed Aug. 24, 1948 2 Sheets-Sheet 1

INVENTOR
A. E. ANDERSON
BY
[signature]
ATTORNEY

Oct. 24, 1950 A. E. ANDERSON 2,527,113

MULTITARGET CATHODE-RAY DEVICE

Filed Aug. 24, 1948 2 Sheets-Sheet 2

INVENTOR
A. E. ANDERSON
BY
ATTORNEY

Patented Oct. 24, 1950 2,527,113

UNITED STATES PATENT OFFICE 2,527,113

MULTITARGET CATHODE-RAY DEVICE

Alva Eugene Anderson, Mountainside, N. J., assignor to Bell Telephone Laboratories, Incorporated, New York, N. Y., a corporation of New York Application August 24, 1948, Serial No. 45,953

11 Claims. (Cl. 315—21)

This invention relates to multi-target cathode ray devices and more particularly to such devices of the type disclosed in Patent 2,452,157, granted October 26, 1948, to Raymond W. Sears and especially suitable for use in multiplex communication systems of the pulse position modulation type.

In such systems, of which that disclosed in the application Serial No. 559,354, filed October 19, 1944 of James O. Edson is illustrative, complex signals at a number of input channels are converted at a transmitter into respective groups or series of pulses each of which is at a time position in a reference cycle, determined by and representative of the amplitude of a respective sample of the corresponding signal. The signals, thus modulated, are transmitted in multiplex to a receiver. At the receiver, each group or series of pulses is converted or translated into an amplitude modulated signal representing or constituting a reproduction of the respective complex signal at the transmitter.

The conversion or translation of a pulse position modulated signal into an amplitude modulated signal may be effected, as disclosed in the above-identified application of Raymond W. Sears, by passing an electron beam of a cathode ray device over an aperture and controlling the beam is such manner that the beam current passed through the aperture for each pulse is of magnitude determined by the position of the pulse in a reference cycle. One aperture may be employed for each channel and the beam may be directed along a path to pass over the several apertures repeatedly in a preassigned sequence. In one form of cathode ray device, the apertures may be openings or windows in a mask or shield, each opening having aligned therewith an output electrode for receiving the beam current passed through that aperture.

One general object of this invention is to improve cathode ray devices especially suitable for use in multiplex communication system.

More specifically, objects of this invention are to:

Facilitate the conversion or translation of pulse position modulated signals into amplitude modulated signals;

Increase the number of signal channels capable of being handled by a cathode ray device of given size;

Improve the segregation of the channels in a multiplex communication receiver, thereby to reduce crosstalk between channels;

Obtain uniformity of and balance between the several channels in such a receiver;

Expedite the attainment of adequate guard space between channels, whereby the guard times requisite are reduced; and Enable the use of relatively simple sweep circuits for effecting deflection of the beam to produce a preassigned trace in a multitarget cathode ray type receiver for pulse position modulated communication systems.

In accordance with one feature of this invention, in a multi-target cathode ray device of the general form described hereinabove, the openings or windows in the mask or shield are arranged in laterally adjacent pairs of rows with the openings or windows in the two rows of each pair in staggered relation. The beam is deflected to pass over successive openings or windows in each pair of rows in sequence and over the openings or windows in successive pairs of rows in succession.

In one illustrative construction, the beam, during each sweep cycle, follows a rectangularly stepped path such that in each pair of rows its trace proceeds from one opening in one row to adjacent a side of the next succeeding opening in the other row, then to the latter opening, then to the space between the first and next succeeding openings in the first row, and so on. The beam may be turned off, or on, by or in response to each signal pulse, so that the beam current passed through any opening or window is determined by the time position of the pulse in the respective channel.

The openings or windows may be of identical form and spacing so that all channel widths are equal in space and time.

In accordance with another feature of this invention, the openings or windows are elongated in the direction normal to the progressive direction of the beam trace, whereby restrictions upon the accuracy of the deflection in the first direction are reduced and the mechanical and electrical design of the deflection system is simplified.

In accordance with a further feature of this invention, the transverse dimensions of the beam at the mask or shield are made somewhat less than those of the openings or windows whereby substantial guard space is realized and the attainment of suitable beam stepping times is facilitated. Thus, effective segregation of the channels is achieved expeditiously with use of only relatively small guard times.

The invention and the above-noted and other features thereof will be understood more clearly and fully from the following detailed description with reference to the accompanying drawing in which.

Figure 1:
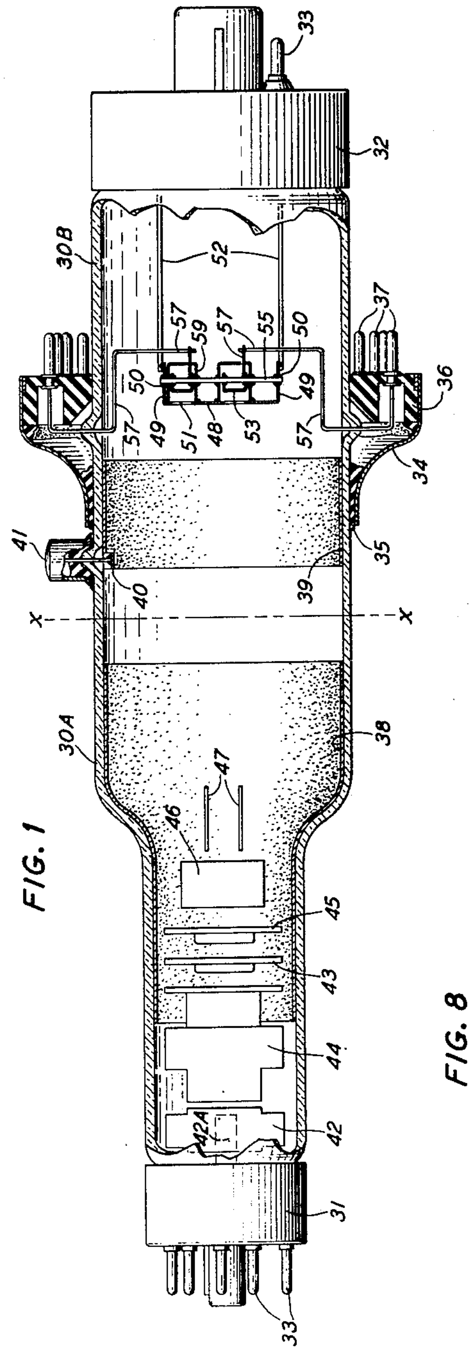
Fig. 1 is an elevational view, mainly in section, of a multi-target cathode device illustrative of one embodiment of the invention.

Referring now to the drawing, the cathode ray device illustrated in Fig. 1 comprises an evacuated vitreous enclosing vessel having two coaxial portions 30A and 30B hermetically joined in endwise relation as indicated at X—X, the portions having bases 31 and 32 carrying terminal prongs 33 at the outer ends thereof. A dished sheet 34 is affixed to the vessel portion 30B, as by cement as indicated at 35, and supports an insulating disc 36 carrying a plurality of terminal prongs 37. The inner wall of the vessel portion 30A has thereon an electrically conductive coating 38, for example of colloidal graphite known commercially as "Aquadag;" the inner wall of the vessel portion 30B has thereon a similar cylindrical coating 39 to which electrical connection may be established by way of a conductor 40 extending from a cap terminal 41 sealed to the vessel portion 30B.

Mounted coaxially within the vessel portion 30A is an electron gun which comprises a cathode 42A, a beam-modulating or control electrode 42, and focusing and accelerating anodes 43, 44 and 45, connected electrically to respective terminals 33 on the base 31. The electron gun may be of conventional construction and, in order to simplify the drawing, the electrodes thereof are shown in outline form in Fig. 1 and the supports and leading-in conductors therefor have been omitted. Also mounted within the vessel portion 30A and connected to respective terminals 33 on the base 31 by leading-in conductors, not shown in Fig. 1, are two pairs of deflector plates 46 and 47 arranged in space quadrature. The electron gun, when energized, projects a concentrated electron beam axially of the vessel 30 and centrally between each of the pairs of deflector plates 46 and 47.

Figure 3:
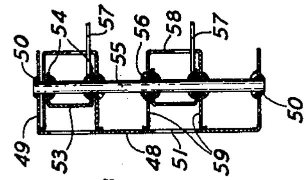
Fig. 3 is a sectional view taken along line 3—3 of Fig. 2.
Figure 2:
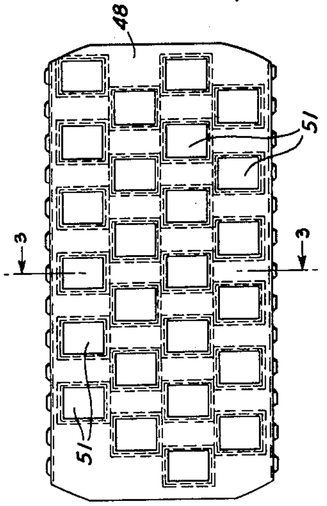
Fig. 2 is a face view of the unitary output assembly included in the device illustrated in Fig. 1.

A unitary target or output assembly, shown in detail in Figs. 2 and 3, is supported within the vessel portion 30B and comprises a metallic mask or shield having a base 48 and flanges 49 provided with a plurality of cross axially aligned slots 50. Advantageously, the shield is treated, in ways known to the art, to minimize secondary electron emission therefrom. As shown most clearly in Fig. 2, the base 48 of the shield is provided with a plurality, for example twenty-five, of identical rectangular or square apertures or windows 51 arranged in pairs of parallel rows and cross-axially of the vessel 30, the apertures in all of the rows being equally spaced, and the apertures in each of the two pairs of rows being in staggered relation. The shield is supported by rigid metallic wires 52 which are connected together electrically and to the terminal prong 33 on the base 32 and serve as leading-in conductors for the shield 48, 49.

A plurality of target electrodes, equal in number to the apertures 51, are mounted within the shield, each of these electrodes having a base 53 and flanges 54, the base of each target electrode being aligned centrally with a respective aperture 51. Advantageously, the target electrodes are constructed to have a secondary electron emission coefficient greater than unity. For example, they may be of an alloy of substantially 99 per cent silver and one per cent magnesium, or the faces of the bases 53 may be coated with a material having a high secondary electron emission coefficient. Each of the target electrodes is supported by an insulating, e. g. ceramic, tube 55 which is fitted in apertures in the electrode flanges 54, seated in a respective pair of cross-axially aligned slots 50 in the shield portions 49, and affixed to the flanges 54 and the portions 49, as by an insulating cement indicated at 56 in Fig. 3.

Individual electrical connection to the target electrodes 53, 54 may be established through leading-in conductors 57, which are sealed to the vessel portion 30B, pass through apertures in the base of the shield 58, and are connected to the respective ones of the terminals 37.

The segregation of the several target electrodes from one another is enhanced by a plurality of metallic shields or barriers 58 which have apertured sides 59. The shields are supported on insulating rods 55 in like manner as the target electrodes and are spaced equally therefrom with the ends of the four sides of each shield 58, butting against the base 48.

Figure 8:
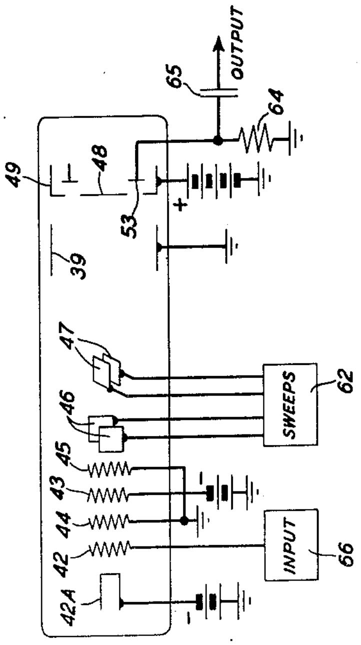
Fig. 8 is a circuit schematic illustrating one manner of operation of the device shown in Fig. 1.

One manner of operation of the device shown in Fig. 1 is illustrated in Fig. 8. The electrodes of the electron gun, only the cathode and control grid of which are shown in Fig. 8, are operated at appropriate potentials to produce a highly concentrated electron beam which is projected between the deflector plates 26 and 27 and toward the target electrodes. One set of the deflector plates, 46, for example, is energized from a source 62 to produce the relatively slow frame sweep of the form shown in either of Figs. 6A or 6B. This time repetitive sweep, by itself causes the beam trace on the target assembly to move relatively slowly from left to right, which direction is assumed for the purpose of illustration, and in the case of Fig. 6A to return over the same path at the same rate. In the case of the frame sweep of Fig. 6B, upon the completion of a left to right movement, the beam returns rapidly to the original position as the voltage falls to zero, and the cycle then is repeated. The second pair of deflector plates, 47, is energized by the line sweep of Fig. 7C, which sweep is formed by the addition of two square waves, Figs. 7A and 7B, of cycle periods of a frame time and twice channel time respectively. The step sweep of Fig. 7A functions, when applied to deflection plates 47, to move the beam trace by amounts given by the voltage extremes of the sweep and the deflection sensitivity of deflection plates 47, holding at each position for the duration of the constant voltage portion of the sweep. The step sweep of Fig. 7A in conjunction with the frame sweep of Fig. 6A, for example, would thus result in a rectangular trace at the target assembly, the trace moving for example around an imaginary rectangle from the upper left hand corner, in Fig. 4, horizontally to the upper right hand corner, hence downward to the lower right hand corner, then horizontally to the lower left hand corner, hence upward to close the cycle at the upper left hand corner, the starting point.

Figure 7A:
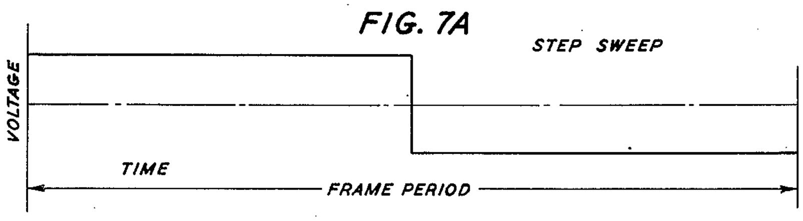
Figs. 7A, 7B and 7C are time scale illustrations of a double square wave line sweep to be applied to the second pair of deflector plates, which sweep in conjunction with the frame sweeps of Figs. 6A and 6B results in the beam trace diagrams of Figs. 4 and 5 respectively.
Figure 7B:
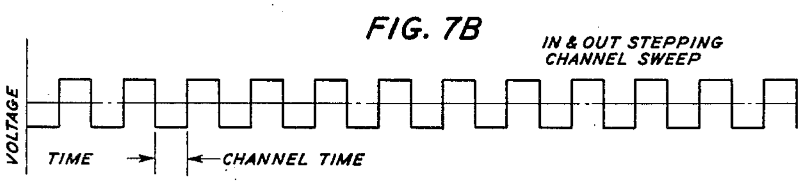
Figure 7C:
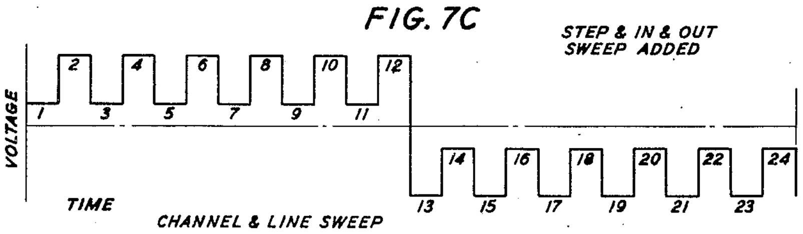

To this simple rectangular trace pattern, there is added a further sweep, the in-and-out stepping sweep of Fig. 7B, which is introduced suitably by adding it to the step sweep of Fig. 7A to produce the sweep illustrated in Fig. 7C. The repetition rate of the in-and-out sweep is so chosen that one complete cycle of the wave corresponds substantially to two channel time widths. Thus the times of the voltage extremes of the in-and-out stepping sweep are each substantially equal to a channel time.

Figure 4:
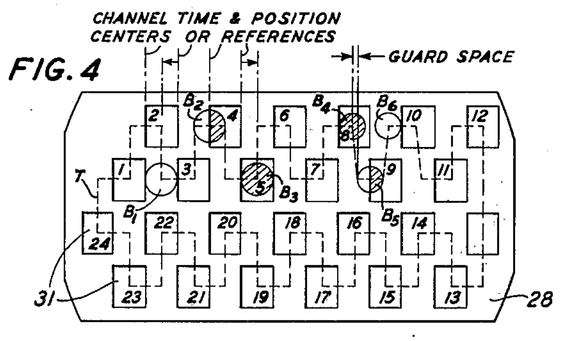
Figs. 4 and 5 are diagrams showing the relation of the apertures or windows in the shield or mask and the beam trace thereat.
Figure 6A:
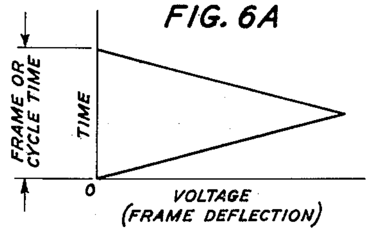
Fig. 6A and Fig. 6B illustrate alternate frame sweeps which may be applied to one pair of the deflector plates.
Figure 5:
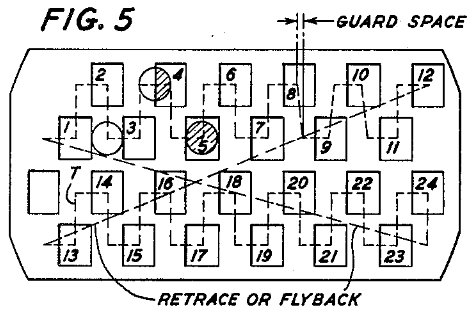
Figure 6B:
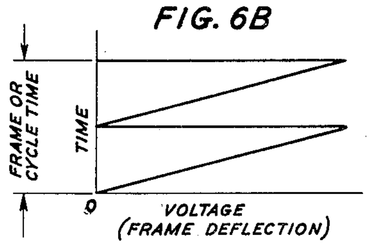

By proper synchronization, by methods well known to the art, the frame sweep of Fig. 6A, for example, and the added step sweep and in-and-out stepping sweep of Fig. 7C, when applied to deflection plates 46 and 47 respectively, combine to produce trace T of Fig. 4. In like manner, the sweeps of Figs. 6B and 7C result in the trace T of Fig. 5. The retraces or fly backs of sweep 6B, shown as the long dashes of trace T of Fig. 5, are blanked by well known means. Specifically, the beam, designated as B and which is of a diameter substantially equal to the width of the apertures 51 at right angles to the section 3—3 of Fig. 2, follows a cross-axially and repeatedly stepped trace T so that it passes into one of the apertures 51 in an inner row, moves vertically, to the upper row, then moves cross-axially into the next adacent aperture, then downward between adacent apertures, then moves cross-axially into the next aperture of the original row and so on to the completion of the first two rows. The large voltage step in the sweep of Fig. 7A then causes the beam to move downward to the bottom two rows. With the frame sweep of Fig. 6A, the in-and-out stepping from aperture to aperture is repeated as previously, but in the reverse direction, finally closing upon itself at the proper instant to start the cycle anew. With the frame sweep of Fig. 6B, which has rapid flyback, the beam is repositioned at the left, but stepped downward by the step wave and a path similar to that traced on the first two rows is repeated, the beam being returned to the original starting position at the conclusion of the sweep. The time order of beam penetration of the apertures 51 in base 48 is indicated by the numerals on the apertures in Figs. 4 and 5. The aperture time orders for the traces T are labeled 1 to 24 in Figs. 4 and 5. Either of the two sweeps described may be used at will without change or interference. In the case of the sweep combination of Figs. 6A and 7C, aperture 24 of Fig. 5 is unused; in case of sweep combinations of Figs. 6B and 7C, aperture 24 of Fig. 4 is unused.

When the beam passes through any aperture, it impinges upon the target electrode therebehind and secondary electrons are emitted from the target electrode and are collected by the shield, 48, 49, which, as shown in Fig. 8, is maintained at a positive potential relative to both the target electrodes and the cathode. Each target electrode has connected thereto a respective output channel including, for example, an output resistor 64 and series condenser 65, only one output channel being shown in Fig. 8. Alternatively, a transformer type output coupling may be used. The current in each output channel in response to impingement of the beam upon the associated target electrode will be, of course, the difference between the secondary electron current from the target electrode to the shield 48, 49 and the primary or beam current to this target electrode. Also, it will be noted that the output current can be determined or controlled by the portion of the beam current which impinges upon any target electrode.

As has been pointed out heretofore, in a pulse position modulated type of system, at the transmitter the output is composed of pulses each of a position relative to a reference cycle determined by the signal sample corresponding thereto. Each of these pulses, as received at the receiver, is utilized to control the beam current to a respective target electrode in such manner that each pulse is translated into an output signal of amplitude determined by the pulse position and proportional to the original signal sample represented by that pulse. Specifically, in one case, the control electrode 42 may be biased from the input circuit 66 so that normally, i. e. in the absence of a signal pulse applied to the control electrode by way of the input circuit, the beam is extinguished. The pulses are so applied that they overcome the bias and, in effect, turn the beam on. The point in the sweep cycle, which is synchronized with the sampling and transmitting cycles at the transmitter, is determined by the time position of the pulse. Thus, the position of each pulse determines the amount of beam current which passes through an aperture 51 when the beam is turned on by the pulse.

For example, if the pulse occurs early in the time sequence of the channel corresponding to the period represented by the arrowed line 1 in Fig. 4, the beam will impinge upon the base 48 of the shield as indicated at $B_1$ and no current change will be produced in the respective output channel. If however, the pulse is applied at the time corresponding to beam position $B_2$, approximately one-half of the beam current will flow to the target associated with the aperture associated with this position and a corresponding current will be produced in the respective channel. If the beam is turned on by a pulse at a time corresponding to beam position $B_3$, the maximum beam current reaches the target associated with the channel corresponding to the time segment represented by the arrowed line 2 in Fig. 4 and the maximum change in current for this channel occurs. For other pulse positions, the output change in any channel will be of amplitude between the minimum, such as at $B_1$, and the maximum, such as at $B_3$. For any pulse position, the output current change in the respective channel will be determined by the beam position and proportional in amplitude to the original signal sample corresponding to the pulse. The current supplied to each channel may be appropriately passed to a low-pass filter, not shown, having a cut-off frequency of one-half the sampling frequency. Thus, the pulse position modulated signals are translated into amplitude modulated signals which are reproductions of the original complex signals.

In the mode of operation described above, the signal pulses are utilized to turn the beam on. They may be used also to extinguish the beam.

which is normally on. The difference between the two cases, it will be apparent, resides in the sense of the change in output currents.

It will be appreciated that in devices constructed in accordance with this invention, a large number of target electrodes may be utilized in any given space because of the in and out stepping of the beam. Furthermore, a separation or segregation of the channels obtains inasmuch as the beam cannot overlap two apertures. Hence, crosstalk between channels is minimized and faithful translation results.

Additionally, it may be noted that substantial guard space may be provided by decreasing the beam width from the limiting value of being exactly equal to an aperture width as illustrated at $B_4$ in Fig. 4. Simultaneously, the introduction of guard space by decreasing the diameter of the beam as at $B_4$, $B_5$ and $B_6$, in Fig. 4 permits rise and fall times of advantageous order to be given to the in-and-out stepping square wave portion of the sweep, illustrated in Fig. 7B. Effective segregation or separation of channels can thus be obtained without the use of long guard times. It will be appreciated that but very small guard space is necessary to assure segregation of the channels and thus prevent crosstalk. For example, the guard space is less than one-half that which would be necessary in a construction involving a single row of apertures or targets. Thus, this invention enables a much greater fraction of the time between successive samples to be used, thereby attaining a corresponding increase in index of modulation or the introduction of additional channels, or both to commensurate degree.

It will be further appreciated that by the geometrical arrangement of the apertures or targets all channel widths and guard spaces are equal in space and in time. It will be appreciated that where a given amount of guard space is predetermined, the apertures 51 may be reduced in width measured at right angles to the section 3—3 of Fig. 2 by a corresponding amount thus insuring greater segregation and providing for greater ease in mounting the components of the target assembly.

An additional feature is the elongation of the apertures 51 at right angles to the progressive direction of the beam trace as illustrated in Figs. 2, 4 and 5, which permits some variations in the in-and-out stepping and step sweeps of Fig. 7, in the corresponding deflector plates characteristics and in mechanical limits, with no deleterious effects. It is to be appreciated that only the dimension of the aperture parallel to the direction of progressive motion of the beam trace is of importance and that the dimension at right angles to the progressive motion may be extended without effect on the faithful translation of pulse position modulated signals into amplitude modulated signals except that the right-angled dimension must not be less than the parallel dimension.

Although specific embodiments of the invention have been shown and described, it will be understood that they are but illustrative and that various modifications may be made therein without departing from the scope and spirit of this invention as defined in the appended claims.

What is claimed is:

1. An electron discharge device comprising a plurality of targets arranged in two laterally adjacent parallel rows with the targets in the two rows in staggered relation, means opposite said targets for projecting an electron beam thereto, and means for deflecting said beam to pass in sequence over successive targets alternately of said two rows.

2. An electron discharge device comprising a plurality of targets mounted in pairs of parallel rows, all of said rows being laterally adjacent and the targets in each pair of rows being in staggered relation, means opposite said targets for projecting an electron beam thereto, and means for deflecting said beam to direct it successively along said pairs of rows and sequentially over successive targets alternately of each of said pairs of rows.

3. An electron discharge device comprising a plurality of targets mounted in two laterally adjacent pairs of parallel rows, the targets in each of said pairs of rows being in staggered relation, means opposite said targets for projecting an electron beam thereto, and means for deflecting said beam to pass it in one direction sequentially over successive targets alternately of one pair of rows and then in the opposite direction sequentially over successive targets alternately of the other pairs of rows.

4. An electron discharge device comprising a plurality of targets arranged in two laterally adjacent parallel rows with the targets in the two rows in staggered relation, means opposite said targets for projecting an electron beam thereto, and means for repeatedly sweeping said beam over said targets along a rectangularly stepped trace, at the targets, which passes sequentially through successive targets in the two rows.

5. An electron discharge device comprising a plurality of targets arranged in two laterally adjacent parallel rows with the targets in the two rows in staggered relation, means opposite said targets for projecting an electron beam thereto, a first pair of deflector plates effective when energized to deflect said beam in the direction parallel to said rows, a second pair of deflector plates effective when energized to deflect said beam in the direction normal to said first direction, and means for simultaneously applying a linear sweep signal to said first deflector plates and a rectangularly stepped energizing signal to said second deflector plates, to direct said beam sequentially over successive targets in the two rows.

6. An electron discharge device comprising a mask member having therein a plurality of apertures arranged in staggered relation in two parallel rows, target means opposite one face of said mask member and opposite said apertures, means opposite the other face of said mask member for projecting an electron beam thereto, and means for sweeping said beam over said other face to pass in sequence over successive apertures alternately of said two rows.

7. An electron discharge device comprising a mask member having therein a plurality of apertures arranged in staggered relation in two parallel rows, said apertures being substantially identical, rectangular and equally spaced and having their sides parallel and normal to the direction of said rows, target means opposite one face of said mask member, means opposite the other face of said mask member for projecting an electron beam thereto, and means for deflecting said beam to produce at said other face a rectangularly stepped trace passing in sequence over successive apertures in the two rows, the elements of said trace being substantially parallel to the sides of said apertures.

8. An electron discharge device in accordance with claim 7 wherein the transverse dimension of said apertures normal to the direction of said rows is greater than the other transverse dimension of said apertures.

9. An electron discharge device comprising a mask member having therein a plurality of apertures arranged in laterally adjacent pairs of parallel rows, said rows being substantially coextensive longitudinally and the apertures in each pair of rows being in staggered relation, means opposite one face of said mask member for projecting an electron beam thereto, electrode means opposite the other face of said mask member for receiving the electrons of said beam passing through said apertures, and deflection means for repeatedly sweeping said beam over said one face along a trace which passes along said pairs of rows in succession and sequentially over successive apertures alternately of each pair of rows.

10. An electron discharge device in accordance with claim 9 wherein said apertures are rectangular and substantially identical and the apertures in said rows are substantially equally spaced, and wherein said deflection means comprises a first deflection system for sweeping said beam in the direction parallel to said rows and a second deflection system for applying to said beam a repetitive rectangular step deflecting force in the direction normal to said parallel direction.

11. An electron discharge device in accordance with claim 10 wherein said apertures are rectangular and have their sides parallel and normal to said rows, the sides of said apertures parallel to said rows being shorter than the sides normal to said rows.

ALVA EUGENE ANDERSON.

REFERENCES CITED

The following references are of record in the file of this patent:

UNITED STATES PATENTS

| Number | Name | Date |
|---|---|---|
| 2,086,904 | Evans | July 13, 1937 |
| 2,121,359 | Luck et al. | June 21, 1938 |
| 2,124,973 | Fearing | July 26, 1938 |
| 2,178,074 | Jakel et al. | Oct. 31, 1939 |
| 2,265,848 | Lewis | Dec. 9, 1941 |
| 2,368,328 | Rosencrans | Jan. 30, 1945 |
| 2,404,106 | Snyder, Jr. | July 16, 1946 |
| 2,452,157 | Sears | Oct. 26, 1948 |